United States Patent [19]

Adamis

[11] 4,380,190
[45] Apr. 19, 1983

[54] COOKING CONE

[76] Inventor: Robert J. Adamis, 3425 Monterrey St., San Mateo, Calif. 94403

[21] Appl. No.: 234,878

[22] Filed: Feb. 17, 1981

[51] Int. Cl.³ .............................................. A47J 37/04
[52] U.S. Cl. ...................................... 99/345; 99/419; 99/447; 99/448; D7/106
[58] Field of Search ..................... 99/421 V, 419, 447, 99/401, 345, 347, 448, 385; D7/85, 106

[56] References Cited

U.S. PATENT DOCUMENTS

| | | | |
|---|---|---|---|
| 375,288 | 12/1887 | Harkins | 99/401 |
| 610,668 | 9/1898 | Wilson | 99/401 |
| 2,969,011 | 1/1961 | Sperl | 99/419 |
| 3,392,665 | 7/1968 | Harnest | 99/426 |

Primary Examiner—Billy J. Wilhite
Attorney, Agent, or Firm—Alfons Puishes

[57] ABSTRACT

By the herein cooking cone, simultaneous cooking of the inside and outer side of food is accomplished through heat flow through the center of the heat conductive cone whereby food is cooked from the center or core of the cone, while the oven heat permeates the food from the outside. The cone has an integral tray on the bottom which is of sufficient depth to accommodate vegetables or the like, thereby an entire meal is cooked simultaneously. The juices flowing down from the food on the outside of the cone into the tray baste the vegetables and other food in the tray. The smaller upper end of the cone is adapted to receive the hooks on skewers on which various meats or other food can be skewered and hung so as to lie on the exterior of the cone.

4 Claims, 4 Drawing Figures

U.S. Patent  Apr. 19, 1983  4,380,190
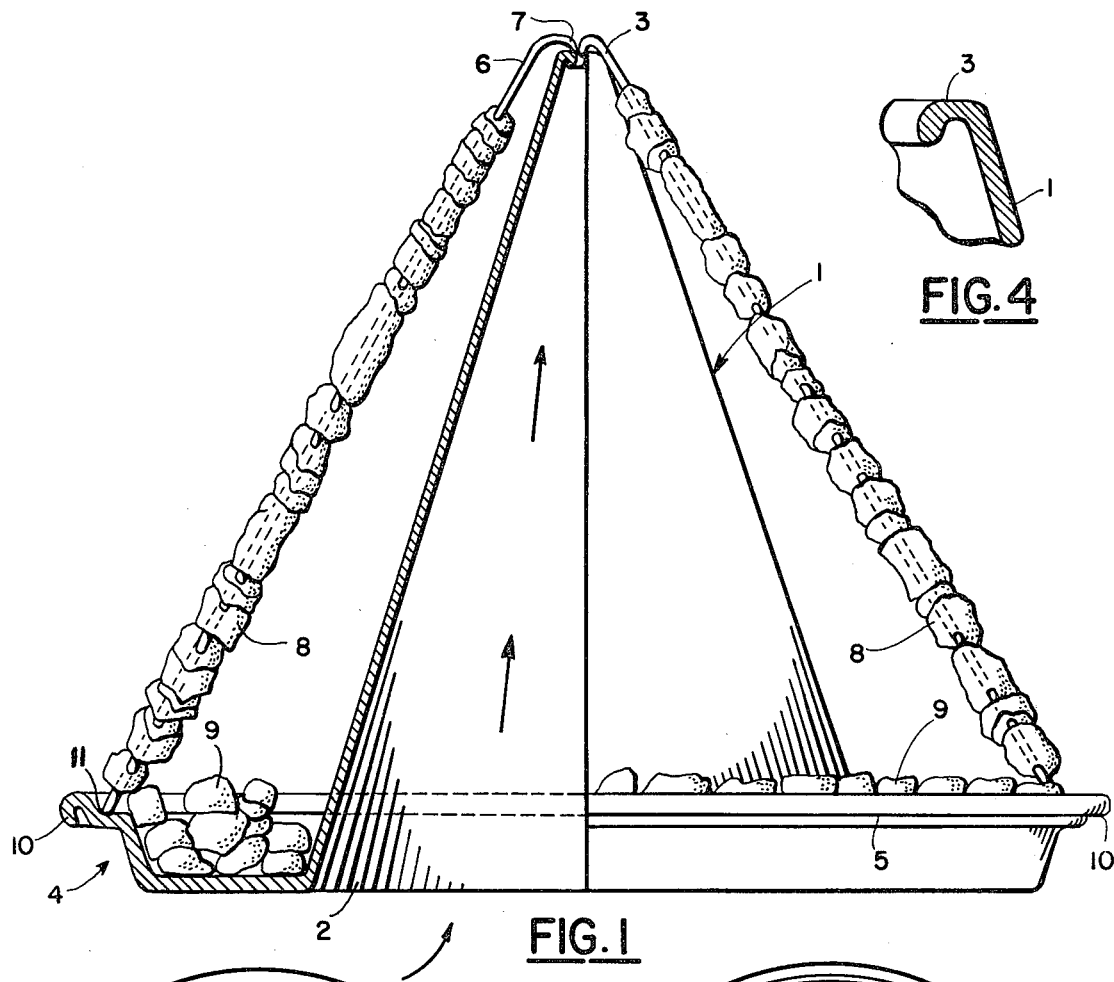
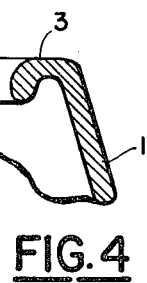
FIG.4
FIG.1
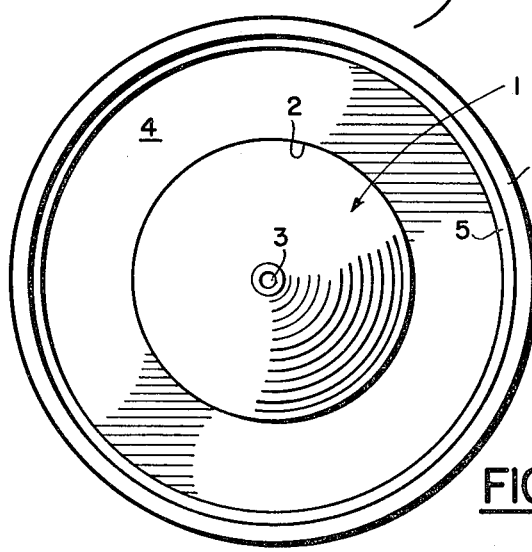
FIG.2
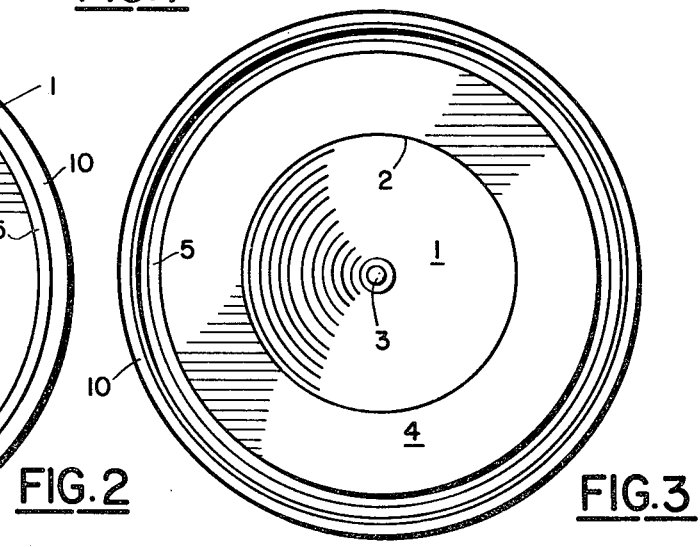
FIG.3

COOKING CONE

THE STATE OF THE ART

The closest article known to applicant is the one shown in U.S. Pat. No. 3,392,665 granted to Harnes on July 15, 1968, in which wire legs form a stand to accomodate a disembowled chicken.

The primary object of the invention is to provide a frustro-conical hollow cone with a tray around the outside of the bottom thereof to permit free rising of heated air through the interior of the cone.

A further object of the invention is to provide such a cooking cone on which skewers with food on them can be hung along the outer surface of the cone and wherein portions of the meal are cooked around the bottom of the cone so as to be blasted by the natural juices from the meat on the skewers.

BRIEF DESCRIPTION OF THE DRAWINGS

FIG. 1 is a partly sectional view of the cooking cone.
FIG. 2 is a top view on a reduced scale.
FIG. 3 is a bottom plan view on a reduced scale.
FIG. 4 is a fragmental sectional view of the top of the cone.

DETAILED DESCRIPTION

A hollow cone 1 is a frustro-conical body open at its bottom 2 and also at its smaller top 3. An annular tray 4 extends outwardly from the cone bottom 2. From the outer periphery of the tray 4 extends upwardly an annular flange 5 so as to form a ring-like dish around the bottom of the cone 1.

Skewers 6 have hooks 7 at the top adapted to hang on the open top 3 and extend downwardly along the cone into the tray dish. The rim 10 on the annular flange 5 of the tray dish extends outwardly so as to form a shoulder 11 on which the skewers 6 may rest in the position shown in FIG. 1.

The herein described cooking cone accomplishes a new direction in oven cookery. When placed in the oven, the heat of the air indicated schematically by the curved arrow at the bottom of FIG. 1 rises up through the center of the metal cone 1 and radiates heat from the center or core of the cone outwardly. In the oven the heat permeates the exposed parts of the food. As a result, food is cooked evenly inside and outside simultaneously and the cooking saves both time and energy.

This cooking cone unit permits the preparation of an entire meal simultaneously. On the built-in tray dish, a variety of vegetables, fruits, rice, turkey dressing, or the like shown schematically at 9, can be placed and be basted in the natural sauces of the meat, fowl, or seafood, as they bake on the cone thereby achieving nourishing and delicious self-basted meals.

The unit herein described is made of sturdy aluminum and together with a plurality of stainless steel skewers hung along its outside accommodates a great variety of receipes such as shish-kebob, or the like. The edge at the top forming the top opening is formed into an inward annular rim to accommodate the hooks 7 and also to retard the flow of the rising hot air which results in eddies within the cone.

I claim:
1. A cooking cone comprising:
   a hollow frustro-conical body open at its larger bottom and at its top to permit the rising of heated air through the inside thereof;
   an annular dish around the bottom of said cone to accommodate portions of food to be basted by juices dripping from the food along the exterior of said conical body;
   said dish being formed on an annular bottom plate integral with and extending outwardly from the lower edge of said cone;
   a plurality of skewers;
   a hook on each of said skewers for hooking over the edge of the open top of said cone for hanging food around the exterior body of said cone whereby said food is exposed simultaneously to external and internal heat;
   a source of heat applied to the bottom of said cone and said dish.
2. A cooking cone comprising:
   a hollow-frustro-conical body open at its larger bottom and at its top to permit the rising of heated air through the inside thereof;
   an annular dish around the bottom of said cone to accommodate portions of food to be basted by juices dripping from the food along the exterior of said conical body;
   said dish being formed on an annular bottom plate integral with and extending outwardly from the lower edge of said cone;
   a plurality of skewers;
   an external rim on said dish for accommodating the lower ends of said skewers;
   a hook on each of said skewers for hooking over the edge of the open top of said cone for hanging food around the exterior body of said cone, whereby said food is exposed simultaneously to external and internal heat;
   a source of heat applied to the bottom of said cone and said dish.
3. The device of claim 1 or claim 2 in which said dish is formed by a perpendicular flange around the outer periphery of said annular bottom plate, said dish being adapted to receive and hold food so as to collect juices from the food cooking around the exterior of said cone.
4. The device of claim 2 in which said external rim on said dish includes a ledge forming an integral part around the periphery thereof.

* * * * *